Nov. 1, 1955  R. B. WENGER  2,722,139
ANTI-SLIP DIFFERENTIAL UNIT
Filed Oct. 20, 1953
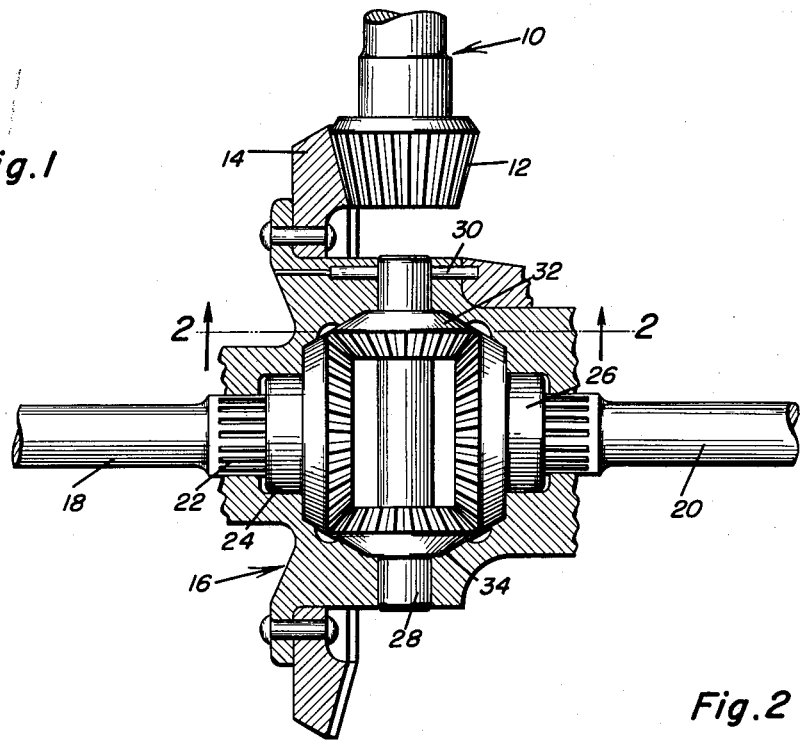
Fig. 1
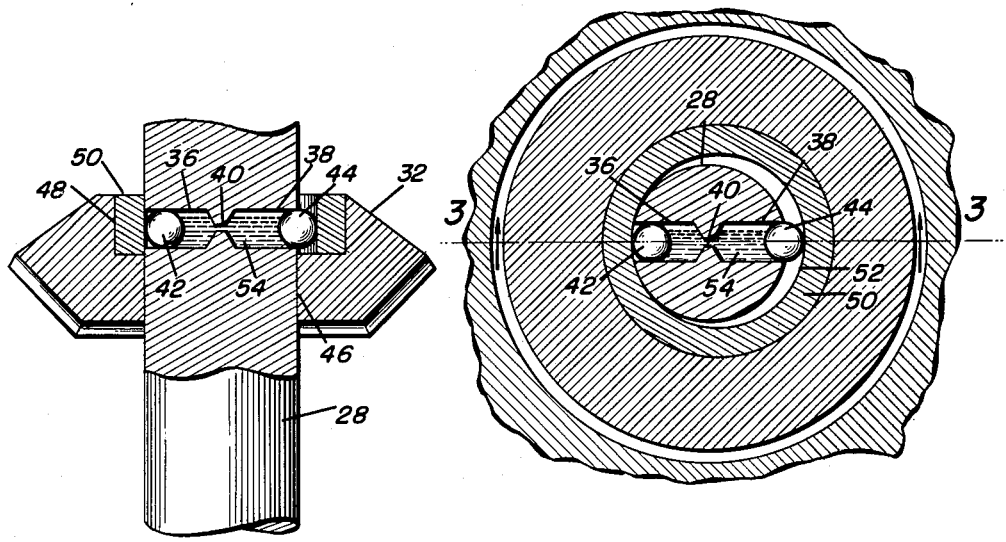
Fig. 2
Fig. 3
Richard B. Wenger
INVENTOR.

United States Patent Office 2,722,139
Patented Nov. 1, 1955

2,722,139

ANTI-SLIP DIFFERENTIAL UNIT

Richard B. Wenger, Minot, N. Dak.

Application October 20, 1953, Serial No. 387,243

4 Claims. (Cl. 74—711)

This invention relates generally to differential units and pertains more particularly to an improved form of device for limiting, retarding or locking out a differential action.

A primary object of this invention is to provide an improved form of velocity brake mechanism for preventing relative slipping between the two driving wheels of an automotive vehicle or the like.

Another object of this invention is to provide a mechanism in conformity with the foregoing object in which the velocity brake is incorporated between one or more of the differential pinions and their associated cross shaft, the cross shaft incorporating a pair of diametrically opposed recesses receiving piston members reciprocable therein with the recesses being interconnected by a metering orifice and the entire space between the piston members being filled with fluid, and the differential pinion associated therewith being journaled on the cross shaft and provided with an eccentric sleeve for reciprocating the pistons for effecting frictional contact between the piston members and the inner surface of the eccentric sleeve when the pinion is rotated with respect to the cross shaft.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a sectional view taken through a common type of differential assembly;

Figure 2 is a transverse section taken substantially on the plane of section line 2—2 in Figure 1 showing the manner in which the velocity brake mechanism is mounted in the differential unit; and, Figure 3 is a transverse sectional view taken substantially along the plane of section line 3—3 in Figure 2 showing further details of construction.

Referring now more particularly to Figure 1, reference numeral 10 indicates generally a conventional drive pinion shaft having the drive pinion 12 associated therewith meshing with the ring gear 14 secured to the housing indicated generally by the reference character 16. As is well understood, a pair of axle members 18 and 20 are suitably secured, as by splines 22 to the axle gears 24 and 26 journaled in opposite sides within the carrier recess and the reference character 28 indicates the differential pinion cross shaft received at its opposite ends in portions of the carrier 16 and secured rigidly thereto as by a pin member 30. A pair of differential pinion members 32 and 34 are journaled on the cross shaft 28 and meshed between the axle gears 24 and 26. All of the above described mechanism is old and well known in the automotive art and depicts one form of differential unit commonly in use.

Referring now more particularly to Figures 2 and 3, it will be seen that the cross shaft 28 is provided with a pair of diametrically opposed recesses 36 and 38 which are interconnected by means of a metering orifice 40 and which slidably receives therein piston members 42 and 44 which may preferably take the form of spherical members or balls. The differential pinion is provided with a bore or opening therethrough, the lower portion of which 46 journals the pinion on the cross shaft 28 and the upper portion of which 48 is enlarged in the manner shown to provide a seat for frictionally receiving the eccentric sleeve member 50 in the manner shown. The inner surface 52 of this sleeve is disposed eccentrically to the outer surface of the cross shaft 28 and it will be evident that ball members 42 and 44 are normally engaged at diametrically opposed points on the inner surface of the sleeve 50 and are held in engagement therewith by virtue of the fact that the chambers presented by the recesses 36 and 38 are filled with a suitable fluid as indicated by the reference character 54. As the differential pinions rotate with respect to the cross shaft 28 due to a relative differential in speed between the axles 18 and 20, the resistance to fluid flow through the metering orifice 40, will effect a frictional force between the ball members 42 and 44 and the inner surface of the sleeve 50. This frictional engagement will increase as the relative speed of the pinion gear members increase. Thus, it will be seen that under such conditions as one wheel of the vehicle is slipping with respect to the other such that the other axle and associated wheel member will not normally receive a sufficient amount of torque from the vehicle engine to move the vehicle, the velocity brake assembly will resist rotation of the pinion members 32 and 34 such as to impart some of the engine torque to the other axle shaft 20.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An anti-slip differential unit comprising a ring gear carrier, a shaft received at its opposite ends in portions of said carrier and rigidly secured thereto, a differential pinion journalled on said shaft, said shaft having diametrically opposed recesses interconnected by a metering orifice, a ball member reciprocably received in each of said recesses, fluid disposed in the space between said ball members, and an eccentric sleeve secured to said pinion effecting reciprocation of said ball members when the pinion rotates on the shaft.

2. In a differential unit, a fixed cross shaft, a differential pinion on said cross shaft, said pinion having a bore therethrough journalling the pinion on the shaft, the bore having an enlarged portion, an eccentric sleeve frictionally disposed within said enlarged portion, said shaft having a pair of diametrically opposed recesses in registry with the inner face of said sleeve, piston members slidably received in said recesses, said recesses being filled with fluid and interconnected by a metering orifice, whereby resistance to fluid flow through said orifice will frictionally engage said piston members with the inner face of the sleeve when the pinion is rotated on the shaft.

3. An anti-slip differential unit comprising a ring gear carrier, a shaft fixed to said ring gear carrier, a differential pinion journalled on said shaft, said shaft having diametrically opposed recesses interconnected by a metering orifice, a piston member reciprocably received in each of said recesses, fluid disposed in the space between said piston members, and an eccentric sleeve secured to said pinion effecting reciprocation of said piston members when the pinion rotates on the shaft.

4. In a differential unit, a fixed cross shaft, a differential pinion on said cross shaft, said pinion having a bore therethrough journalling the pinion on the shaft, the bore having an enlarged portion, an eccentric sleeve fixed within said enlarged portion of the bore, said shaft having a pair of diametrically opposed recesses in registry with the inner face of said sleeve, a ball member reciprocably received in each of said recesses, said recesses being filled with fluid and interconnected by a metering orifice, whereby resistance to fluid flow through said orifice will engage said ball members with the inner face of the sleeve when the pinion is rotated on the shaft.

References Cited in the file of this patent

UNITED STATES PATENTS

| | | |
|---|---|---|
| 1,838,380 | Fraser | Dec. 29, 1931 |
| 1,916,715 | Corey | July 4, 1933 |
| 2,218,896 | Shultz | Oct. 22, 1940 |
| 2,234,592 | Fitzner | Mar. 11, 1941 |

FOREIGN PATENTS

| | | |
|---|---|---|
| 430,128 | Italy | Feb. 9, 1948 |